United States Patent
Bharti et al.

(10) Patent No.: US 10,755,216 B2
(45) Date of Patent: Aug. 25, 2020

(54) ENERGY SUPPLIER STRATEGY BASED ON SUPPLIER CONFIDENCE SCORING

(71) Applicant: International Business Machines Corporation, Armonk, NY (US)

(72) Inventors: Harish Bharti, Pune (IN); Abhay K. Patra, Pune (IN); Rajesh K. Saxena, Thane East (IN)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 15/299,517

(22) Filed: Oct. 21, 2016

(65) Prior Publication Data
US 2018/0114167 A1 Apr. 26, 2018

(51) Int. Cl.
G06Q 10/06 (2012.01)
G06Q 30/08 (2012.01)
G06Q 50/06 (2012.01)

(52) U.S. Cl.
CPC ....... *G06Q 10/06315* (2013.01); *G06Q 30/08* (2013.01); *G06Q 50/06* (2013.01); *Y02P 90/82* (2015.11)

(58) Field of Classification Search
None
See application file for complete search history.

(56) References Cited

U.S. PATENT DOCUMENTS

| | | | |
|---|---|---|---|
| 5,794,212 A | 8/1998 | Mistr, Jr. | |
| 6,681,156 B1 | 1/2004 | Weiss | |
| 8,428,785 B2 * | 4/2013 | Boucher | G06Q 30/02 700/295 |
| 2003/0220773 A1 * | 11/2003 | Haas | G06Q 10/0637 703/2 |
| 2004/0167677 A1 * | 8/2004 | Weiss | G06O 40/04 700/291 |

(Continued)

FOREIGN PATENT DOCUMENTS

KR 20130037559 A 4/2013

OTHER PUBLICATIONS

Chao, Hung-Po et al.; "Multi-Dimensional Procurement Auctions for Power Reserves: Robust Incentive-Compatible Scoring and Settlement Rules"; Journal of Regulatory Economics; 22:2; pp. 161-183; 2002; Copyright 2002 Kluwer Academic Publishers. Manufactured in The Netherlands.

(Continued)

*Primary Examiner* — Alan S Miller
*Assistant Examiner* — Arif Ullah
(74) *Attorney, Agent, or Firm* — Donald J. O'Brien

(57) ABSTRACT

A system, method and program product for evaluating energy suppliers from a set of energy suppliers to meet demand for a distribution grid. A system is disclosed that includes: a bid volatility index (BVI) calculator that determines a BVI for each supplier for an offer; a profiling system that profiles each supplier with a set of predictor variables; a ranking system that determines a winning bid probability of each supplier based on the predictor variables; a modeling system that refines the winning bid probability based on changes to at least one predictor variable; and a scoring system that determines a confidence score for each supplier, wherein the confidence score indicates a confidence level that the supplier can meet the offer.

6 Claims, 12 Drawing Sheets

(56) References Cited

U.S. PATENT DOCUMENTS

| | | | | |
|---|---|---|---|---|
| 2006/0053063 A1* | 3/2006 | Nagar | ............ | G06Q 10/04 705/26.61 |
| 2011/0231230 A1* | 9/2011 | Christon | ............ | G06Q 10/06 705/7.42 |
| 2014/0006201 A1* | 1/2014 | Judd | ............ | G06Q 30/08 705/26.3 |
| 2014/0200953 A1* | 7/2014 | Mun | ............ | G06Q 10/04 705/7.28 |
| 2014/0330695 A1 | 11/2014 | Steven et al. | | |

OTHER PUBLICATIONS

Duann, Daniel J. et al.; "Competitive Bidding for Electric Generating Capacity: Application and Implementation"; The Nation Regulatory Research Institute; Nov. 1988; pp. 184.

Frerk, Maxine; "State of the Market Assessment"; Office of Fair Trading; ofgem Marketing a positive difference for energy consumers; CMA Competition & Markets Authority; Publication Date: Mar. 27, 2014; pp. 120.

Cocks, Nicola, et al.; "State of the market report—Assessment framework"; Office of Fair Trading; ofgem Marketing a positive difference for energy consumers; CMA Competition & Markets Authority; Publication Date: Dec. 19, 2013; pp. 30.

* cited by examiner

| Price | prob(P) | BVI |
|-------|---------|---------|
| 3.6 | 0.9330592 | 22.4855 |
| 3.7 | 0.9352221 | 22.41523 |
| 3.8 | 0.9373199 | 22.32551 |
| 3.9 | 0.9393541 | 22.21752 |
| 4 | 0.9413264 | 22.0924 |
| 4.1 | 0.9432385 | 21.95127 |
| 4.2 | 0.9450918 | 21.79517 |
| 4.3 | 0.9468881 | 21.62514 |

| X | Acronym | Predictor variable | Ranking meter |
|---|---|---|---|
| $X_1$ | BVI | Bid volatility index | Between 0 and 100 – derived as explained further in section x.x |
| $X_2$ | ES | Efficiency scoring | Between 0 and 100 – as a measure of their energy quality over time. |
| $X_3$ | MA | Availability in the market | Moving average of participation in last 10 bids with 1 as yes and 0 as no. |
| $X_4$ | PED | Precise Prediction of Energy Demand | In %, Construed as the supplier production uptime |
| $X_5$ | C | Capacity | In MWatts, of the entire production capacity |
| $X_6$ | FW | Purchase from forward markets | In MWatts, as the maximum purchase made at any time. |
| $X_7$ | LEM | Liquidity in the Energy Market | $\dfrac{(P_a - P_b)}{(P_a + P_b)/2}$<br>Pa is maximum ask price, Pb is minimum bid price |
| $X_8$ | BOS | bid-offer spread | Defined as Average (P-C) over all n bids |
| $X_9$ | CR | churn ratio | As %, $Abs\{log(p(P)/(1 - p(P)))\}$ |
| $X_{10}$ | CLR | Collateral Requirement for Price Fluctuation | Yes / No as indicated as 1 or 0 |
| $X_{11}$ | VI | Vertical Integration | Yes / No as indicated as 1 or 0 |

Figure 5

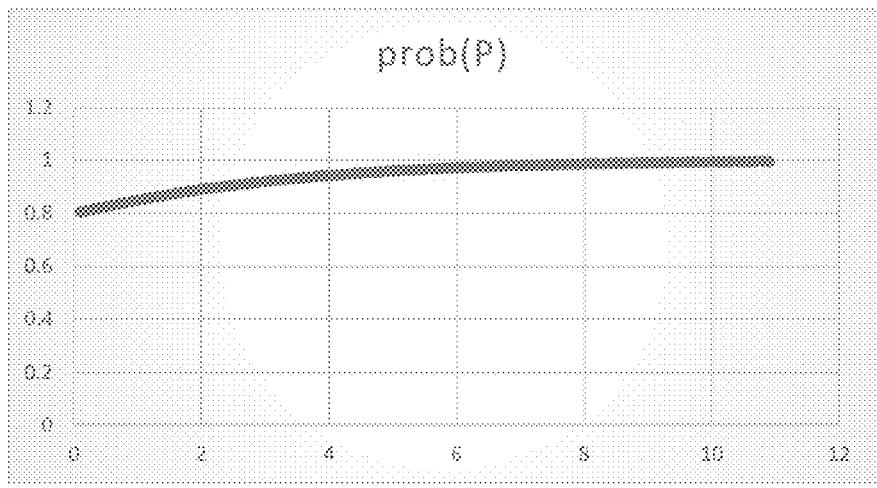

Figure 7

| Profile | | | | |
|---|---|---|---|---|
| | Acronym | Predictor variable | Ranking meta | Ranking score |
| $X_1$ | BVI | Bid volatility index | Between 0 and 100 – derived as explained further in section x.x | 22 |
| $X_2$ | ES | Efficiency scoring | Between 0 and 100 – as a measure of their energy quality over time. | 86 |
| $X_3$ | MA | Availability in the market | As %, Moving average of participation in last 10 bids with 1 as yes and 0 as no. | 70% |
| $X_4$ | PED | Precise Prediction of Energy Demand | In %, Construed as the supplier production uptime | 95% |
| $X_5$ | C | Capacity | In MWatts, of the entire production capacity | 15 |
| $X_6$ | FW | Purchase from forward markets | In MWatts, as the maximum purchase made at any time. | 3 |
| $X_7$ | LEM | Liquidity in the Energy Market | Pa is maximum ask price, Pb is minimum bid price | 18% |
| $X_8$ | BOS | bid-offer spread | Defined as Average (P-C) over all n bids | 70% |
| $X_9$ | CR | churn ratio | | 1.16% |
| $X_{10}$ | CLR | Collateral Requirement for Price Fluctuation | Yes / No as indicated as 1 or 0 | 1 |
| $X_{11}$ | VI | Vertical Integration | Yes / No as indicated as 1 or 0 | 0 |

Figure 8

```
R Console

> supplierData <- read.csv("dataforR.csv", header=TRUE)
>
> logFitValues = glm(win~bid_quantity+offer_price+BVI+ES
+ +MA+PED+C+FW+LEM+BOS+CR+CLR+VI, family = binomial, data=supplierData)
> summary(logFitValues)

Call:
glm(formula = win ~ bid_quantity + offer_price + BVI + ES + MA +
    PED + C + FW + LEM + BOS + CR + CLR + VI, family = binomial,
    data = supplierData)

Deviance Residuals:
    Min       1Q   Median       3Q      Max
-1.4468  -1.1779  -0.7212   1.1094   1.7282

Coefficients: (9 not defined because of singularities)
              Estimate Std. Error z value Pr(>|z|)
(Intercept)   -1.25650    4.91630  -0.256   0.7983
bid_quantity   0.05889    0.11017   0.534   0.5930
offer_price   -0.09267    1.09946  -0.084   0.9328
BVI                 NA         NA      NA       NA
ES                  NA         NA      NA       NA
MA             2.58756    1.32092   1.959   0.0501 .
PED                 NA         NA      NA       NA
C                   NA         NA      NA       NA
FW                  NA         NA      NA       NA
LEM                 NA         NA      NA       NA
BOS                 NA         NA      NA       NA
CR            -0.81484    2.00476  -0.406   0.6844
CLR                 NA         NA      NA       NA
VI                  NA         NA      NA       NA
---
Signif. codes:  0 '***' 0.001 '**' 0.01 '*' 0.05 '.' 0.1 ' ' 1
```

Figure 9

| bid quantity | offer price | MA | CR | prob(P) | theta |
|---|---|---|---|---|---|
| 5 | 4 | 0.47 | 0.01 | 0.47 | 0.88 |
| 6 | 4 | 0.47 | 0.01 | 0.48 | 0.94 |
| 7 | 4 | 0.47 | 0.01 | 0.50 | 0.99 |
| 8 | 4 | 0.47 | 0.01 | 0.51 | 1.05 |
| 9 | 4 | 0.47 | 0.01 | 0.53 | 1.12 |
| 10 | 4 | 0.47 | 0.01 | 0.54 | 1.18 |
| 7 | 3.6 | 0.47 | 0.01 | 0.51 | 1.03 |
| 7 | 3.7 | 0.47 | 0.01 | 0.50 | 1.02 |
| 7 | 3.8 | 0.47 | 0.01 | 0.50 | 1.01 |
| 7 | 3.9 | 0.47 | 0.01 | 0.50 | 1.00 |
| 7 | 4 | 0.47 | 0.01 | 0.50 | 0.99 |
| 7 | 4.1 | 0.47 | 0.01 | 0.50 | 0.98 |
| 7 | 4.2 | 0.47 | 0.01 | 0.49 | 0.97 |
| 7 | 4.3 | 0.47 | 0.01 | 0.49 | 0.96 |

US 10,755,216 B2

ENERGY SUPPLIER STRATEGY BASED ON SUPPLIER CONFIDENCE SCORING

TECHNICAL FIELD

The subject matter of this invention relates to energy distribution, and more particularly to a system and method of determining a supplier strategy based on supplier confidence scores to enhance energy distribution.

BACKGROUND

In electricity distribution operations, utilities perform long term and short term demand forecasting to plan adequately for power generation needs, which includes supply side solutions and demand responses. More often than not, to meet the short term demand, utilities go for spot or short term energy purchases from traditional large energy suppliers and smaller suppliers. Most of the time these spot purchases end up floating an energy procurement contract for the shortage amount of power required to meet the demand requirement. Contracts for the energy blocks that are provided in the market do not take into account the fact that the price for the block might be lower if the blocks are subdivided into smaller blocks. This can be true because each supplier operates at a different level of efficiency and thus has a different risk appetite.

There currently is no solution available to determine: which suppliers can best fill which type of need; what is the price elasticity with the given suppliers in the market; whether breaking the contract into smaller parts changes price elasticity or results in a better mix of suppliers to provision the increased demand; or whether filling a spot need by subdividing reduces risks associated with the dependence of large value contracts.

SUMMARY

Aspects of the disclosure provide a supplier scoring system that is used to score suppliers when a need exists to meet energy demands in a distribution grid.

A first aspect discloses a system for evaluating energy suppliers from a set of energy suppliers to meet demand for a distribution grid, including: a bid volatility index (BVI) calculator that determines a BVI for each supplier for an offer; a profiling system that profiles each supplier with a set of predictor variables; a ranking system that determines a winning bid probability of each supplier based on the predictor variables; a modeling system that refines the winning bid probability based on changes to at least one predictor variable; and a scoring system that determines a confidence score for each supplier, wherein the confidence score indicates a confidence level that the supplier can meet the offer.

A second aspect discloses a computer program product stored on a computer readable storage medium, which when executed by a computing system, evaluates energy suppliers from a set of energy suppliers to meet demand for a distribution grid, the program product including: program code that determines a bid volatility index (BVI) for each supplier for an offer; program code that profiles each supplier with a set of predictor variables; program code that determines a winning bid probability of each supplier based on the predictor variables; program code that refines the winning bid probability based on changes to at least one predictor variable; and program code that determines a confidence score for each supplier, wherein the confidence score indicates a confidence level that the supplier can meet the offer.

A third aspect discloses a computerized method that evaluates energy suppliers from a set of energy suppliers to meet demand for a distribution grid, the method including: determining a bid volatility index (BVI) for each supplier for an offer; profiling each supplier with a set of predictor variables; determining a winning bid probability of each supplier based on the predictor variables; refining the winning bid probability based on changes to at least one predictor variable; and determining a confidence score for each supplier, wherein the confidence score indicates a confidence level that the supplier can meet the offer.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a profile table according to embodiments.

FIG. 7 depicts a probability curve according to embodiments.

FIG. 8 depicts an illustrative profile table with ranking scores according to embodiments.

FIG. 9 depicts an illustrative output scores according to embodiments.

FIG. 10 depicts

Figure 1:
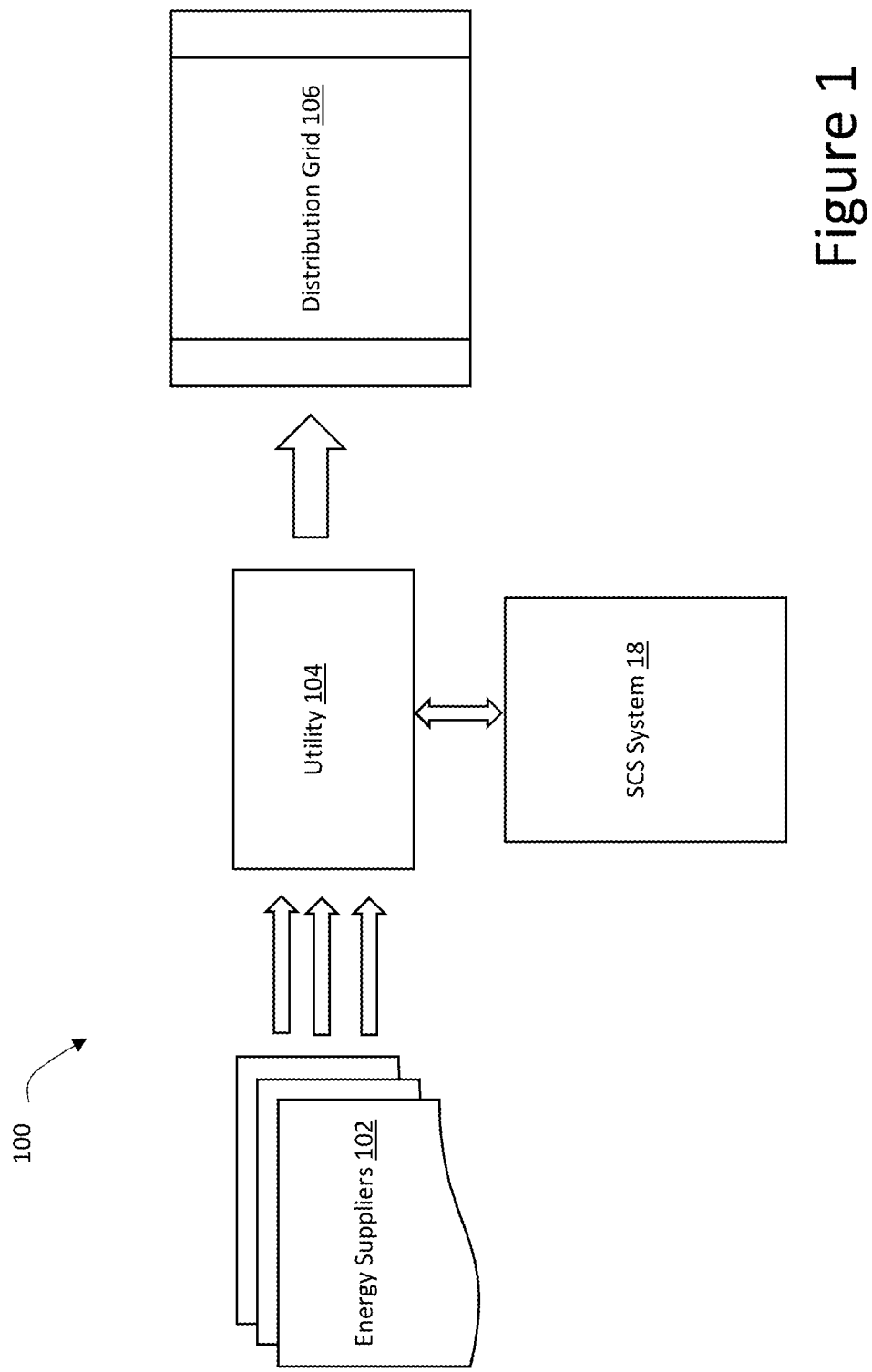
FIG. 1 shows an energy distribution system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts an energy distribution architecture 100 for providing energy to a distribution grid 106. Energy is provided to the distribution grid 106 via a utility 104 that utilizes a supplier confidence scoring (SCS) system 18 to engage energy suppliers 102 for energy units to meet a given demand, particularly in a spot market or the like. Using SCS system 18, the utility 104 can arrange to most effectively obtain energy units from available energy suppliers 102 to meet demand.

Figure 2:
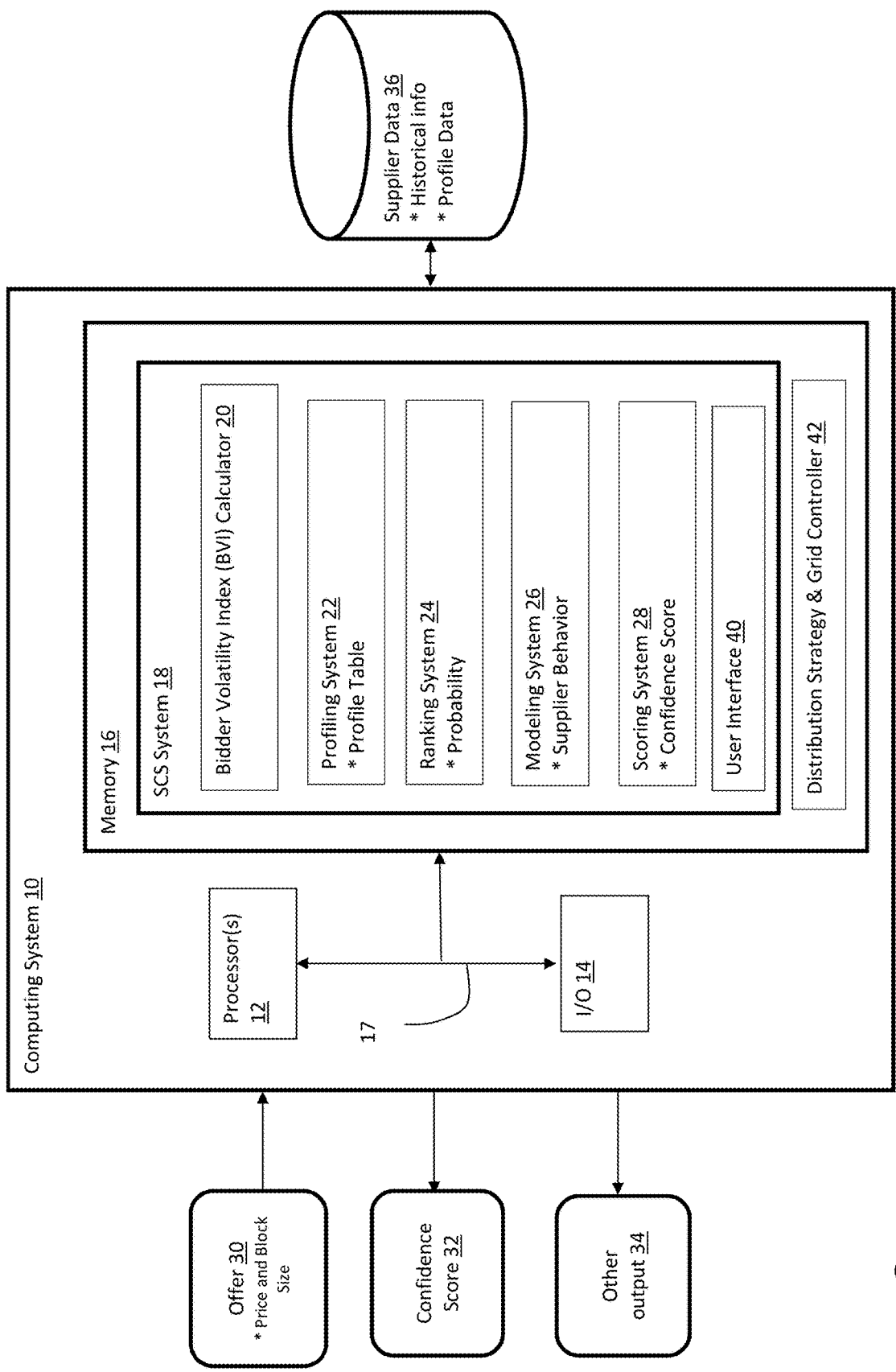
FIG. 2 shows a computing system having a supplier confidence scoring system according to embodiments.

FIG. 2 depicts a computing system 10 that includes an SCS system 18 that generates a confidence score 32 and other output 34 for a supplier based on an inputted offer 30 (e.g., offer price and block size) and stored supplier data 36.

SCS system 18 generally includes a bidder volatility index (BVI) calculator 20 that provides a probability of the supplier winning the offer 30; a profiling system 22 that grades different attributes or predictor variables of the supplier (including the BVI); a ranking system 24 that ranks the supplier across a network of suppliers; a modeling system 26 that allows for the evaluation of the supplier based on changes in the predictor variables; and a scoring system 28 that congregates all of the above to generate a final confidence score 32.

BVI calculator 20 provides an index that captures how the supplier bids for a given block. This will capture the essence of the volatility of the bidding sequence that the supplier has produced with the distribution grid 106 in the past. This will take into account the fluctuations and responses thereby giving a preview as to how the supplier will respond for a given request.

Given the historical information stored in supplier data 36, it is known how a supplier (i.e. bidder) responses to different price offers. This information is used to converge to price points that would represent the supplier's perceived strike price and create pricing zones such as:

(1) Most Expected—anticipating the most expected response with maximum conversion;
(2) Boundary Skimming—showing high volatility with least conversion rates; and
(3) Desirable—showing scarce bids that have been randomly won.

The process involves building a pricing function based on historical data (win/loss data per price quoted). In this approach, the supplier does not face a decision of what price to place on a bid to attract demand but instead what price should be quoted to this particular supplier to win this particular bid opportunity (i.e., customized pricing).

Sometimes even bids from the same customer may contain some inherent amount of uncertainty in the bid-winning probability because the bid-requesting utility 104 randomly allocates its business to different suppliers to ensure a competitive market for future bids. Because of these practices, the pricing model will never be able to remove all uncertainty for a supplier from the bid-price response process. To overcome this, a probabilistic model is employed as follows:

Let the probability $\rho$ of winning a bid for a given price P be as follows:

$$\rho(P) \in [0,1] \qquad \text{Eq. 1}$$

in which the function should decrease monotonically as the price increases, and the function should be bounded by zero and one.

Figures 3, 4:
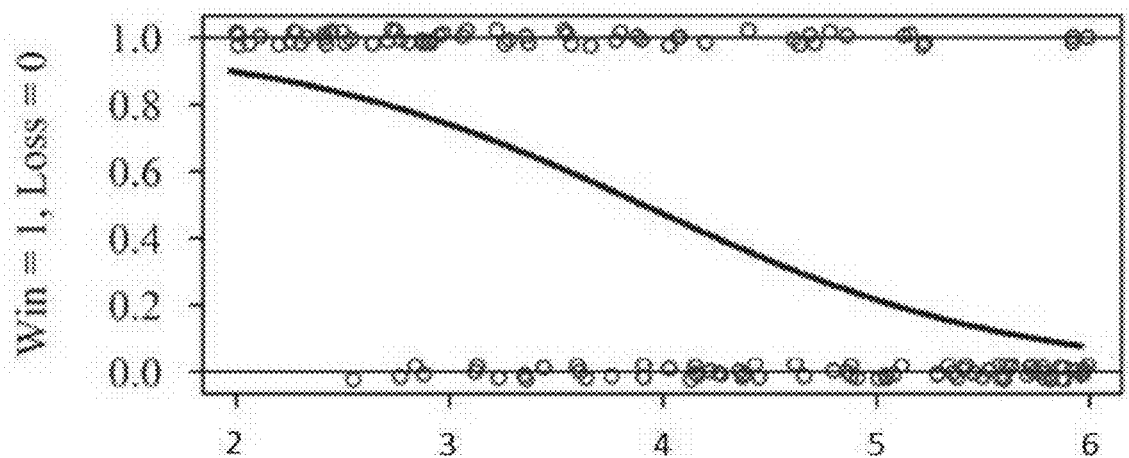
FIG. 3 shows a probability curve for calculating a BVI according to embodiments.
FIG. 4 shows calculated BVI values for different prices according to embodiments.

In this case, a reverse fit, i.e., inverse, S curve probability function is provided as shown in FIG. 3. The probability function used in this embodiment is a logit function that is inverse S-shaped and approaches one and zero at low and high prices, respectively.

From logit transformation, we get, $$\rho(P) = e^{\wedge}(a+b \cdot P)/(1+e^{\wedge}(a+b \cdot P)) \qquad \text{Eq. 2}$$

Where, a and b are parameters that must be estimated to fit the historical win/loss data using maximum-likelihood estimates, i.e., parameter values (a, b) are chosen to maximize the likelihood of the observed values, shown in the following equation as:

$$\text{Max } \Sigma_i((\rho(P_i|a,b)^{W_i} \cdot (1-\rho(P_i|a,b))^{(1-W_i)}) \qquad \text{Eq. 3}$$

Each historical bid opportunity is defined with the subscript i (with Wi representing the indicator response variable, 1=win and 0=loss, and Pi representing the supplier's price response for bid opportunity i). Specifically, by using the information on past wins and losses, this model estimates the probability of winning the bid as a function of the offered price by reverse fitting a probability function.

From this, the Bidder Volatility Index, BVI, is generated that captures the variation on the probability distribution function as follows:

$$BVI = n \cdot \rho(P) \cdot (1-\rho(P)) \qquad \text{Eq. 4}$$

Where, n is the number of past bids by the supplier. FIG. 4 depicts an example output of the BVI calculator 20 for different price points for a supplier.

As noted, profiling system 22 captures a set of attributes (i.e., predictor variables) for assessing a given supplier. Illustrative attributes that may impact a profile are captured for each individual supplier. These include, but are not limited to the following:

(1) Bid volatility index.
(2) Efficiency scoring: The Supplier Efficiency scoring enables energy trading to be more coherent for the utilities and is responsible for optimized trading.
(3) Availability in the market: The energy availability in the market influences the supplier score in terms of bid prices and competitive bidding.
(4) Precise Prediction of Energy Demand: Precise Energy Demand Forecasting enables utilities to define their short term and long term demand. It influences trading and supplier profile.
(5) Capacity: The capacity of individual supplier which influences the energy contract price considerably and hence the supplier confidence score.
(6) Purchase from forward markets: Wholesale electricity price fluctuates significantly and the change cannot be passed on to the end customers immediately. This may cause a loss of retail margin for the suppliers. To address this risk, suppliers seek to hedge their position by buying electricity from counterparties on forward markets up to two or three years ahead.
(7) Liquidity in the Energy Market: Liquidity in the Energy Market is the ability to buy and sell electricity without causing significant changes to its price and without incurring significant transaction costs. Hence liquidity has a calming impact on electricity prices that effects the energy contracts and supplier confidence score.
(8) Bid-offer spread: This is an indication of the robustness of the electricity price—a tight spread indicates that arbitrage opportunities are being exhausted and gives market participants confidence that they can buy and sell at a price that reflects the underlying supply and demand conditions. It is another measure of the liquidity in the Energy Market.
(9) Churn ratio: Churn ratio is ratio of traded volume of the energy to the physical output or consumption of the traded energy. It is a high level measure of the liquidity in the Energy Market.
(10) Collateral Requirement for Price Fluctuation: The wholesale electricity price fluctuation is generally addressed by purchasing in forward markets. However this brings in a new risk of counter party defaulting on a trade between when the contract is agreed and when the power is delivered. This risk is commonly mitigated is through posting collateral and the collateral requirement is based on when the wholesale price changes relative to the price agreed in the contract.
(11) Inter Connectors Availability: The contract price of electricity is also dependent on the Inter Connectors availability as electricity demand can be fulfilled by Inter Connectors in a short term demand situation depending on the availability of local generation and energy price offered by Inter Connectors.

(12) Vertical Integration: Vertical Integration in electricity market is an arrangement where a group of the largest suppliers of electricity directly owns about 70 percent of the generation capacity. It provides a financial hedge against volatile wholesale energy prices and a natural hedge against balancing risk. As well as having less of a requirement to trade, integrated suppliers are also likely to have stronger credit ratings, allowing them to post lower levels of collateral.

These attributes are then build into the supplier profile to be ranked under the 'predictor variables'. These are captured and updated for every transaction which is done along with the suppliers. An example profile table of these 11 attributes is shown in FIG. 5. Each attribute is ranked in the right hand column for each supplier. All the attributes are states as per the ranking meter. These will be exposed as dimensions of the profile which can be used for any aggregation, discernment or congregation logic.

The profiling table helps the capture values for predictor variables coalescing all the relevant past values. Thus, the information about the supplier is enhanced every time the supplier bids or averts a bid across all the predictor variables.

Ranking system 24 provides a model that predicts the bid probability for the supplier and ranks the supplier across the supplier network available for a demand. All the profile information stored under the predictor variables are used to predict the win probability of a given supplier.

The dependent variable is the bid event of the supplier, i.e., either the supplier will participate in a bid or not participate. Thus, we have a dichotomous dependent variable whose value has to be derived from set of independent predictor variables. The ranking employs a logistic regression model which does not assume multi-normality and also gives an estimate for the probability of win. The logit model derives the coefficients of the independent variables to predict default probability of occurrence of a dichotomous dependent variable.

Thus we want to predict the probability that a supplier bid will be rewarded given the pretext of the predictor variables. This will also have to take into consideration all the suppliers bidding for a particular contract.

In the context of win prediction, the technique weighs the predictor variable and creates a probability for each supplier in order to be classified as either bidder or unqualified. The function in logit analysis is called the logistic function and can be written as follows:

$$p(SC_i) = \log[p_i/(1-p_i)] = \alpha + \beta_1 X_{i1} + \beta_2 X_{i2} + \ldots + \beta_k X_{ik} = X_i \beta \quad \text{Eq. 5}$$

Where, $p(SC_i)$ is the probability that the supplier i bid will be accepted, pi is the probability of winning bid for i supplier and k predictor variables.

From the profiling table and Eq. 1, we get, $$p(SC_i) = \log\left[\frac{p_i}{1-p_i}\right] = \quad \text{Eq. 6}$$
$$\alpha + \beta_1 \cdot BVI + \beta_2 \cdot ES + \beta_3 \cdot MA + \beta_4 \cdot PED + \beta_5 \cdot C + \beta_6 \cdot FW +$$
$$\beta_7 \cdot LEM + \beta_8 \cdot BOS + \beta_9 \cdot CR + \beta_{10} \cdot CLR + \beta_{11} \cdot VI = X_i \beta$$

The coefficients $\alpha, \beta_1 \ldots \beta_{11}$ of the predictor variables $X_1 \ldots X_k$ are estimated by employing maximum likelihood method. We can transform Eq. 1 using logistic transformation as, $$p(SC_i) = \frac{e^{(X_i \beta)}}{1 + e^{(X_i \beta)}} \quad \text{Eq. 7}$$

Where the value is $X_i \beta$ is elaborated by Eq. 2.

Modeling system 26 allows for the suppliers to be evaluated based on changes to the predictor variables, e.g., via user interface 40. As we are interested in modeling the chance of success for a supplier, we define a ratio θ as the odds ratio, such that, $$\theta = \frac{p(SC_i)}{1 - p(SC_i)} \quad \text{Eq. 8}$$

In an eventuality where we want to give more importance to suppliers with higher energy efficiency, the value $X_2$: ES would increase by 1, then we get the improvement of suppliers' odds as $$\theta_{new} = \theta \cdot e^{\beta i} \quad \text{Eq. 9}$$

With such a modeling available, the process is able to check the favorability of suppliers for each predictor variable $X_i$. The odds ratio helps understand the sensitivity such as how much a probability of successful bid increase with a unit decrease in price or unit increase in efficiency scoring or any other predictor variable used in the profiling table.

Finally, scoring system 28 generates a supplier confidence score 32. The odds ratio of Eq. 4 is used to derive the supplier score as it congregates all the information used to profile a supplier in the relevant energy demand-supply production frontier. The supplier score denoted as S is computed as the percentage of scores in its frequency distribution that are equal to or lower than it.

$$S = \frac{C_l + 0.5 f_i}{N} \times 100\% \Big| \{\theta_i \mid i \in (1 \ldots N)\} \quad \text{Eq. 10}$$

Where,
$C_l$ is the count of all scores less than the score of interest;
fi is the frequency of the score of interest;
N is the number of the supplier in the consideration; and
$\theta_i$ is the odds ratio for the Supplier i in the consideration.

The confidence score 32 for each supplier may then be fed to distribution strategy & grid controller 42 that selects and engages suppliers 102 to provide energy to the distribution grid 106.

Figure 6:
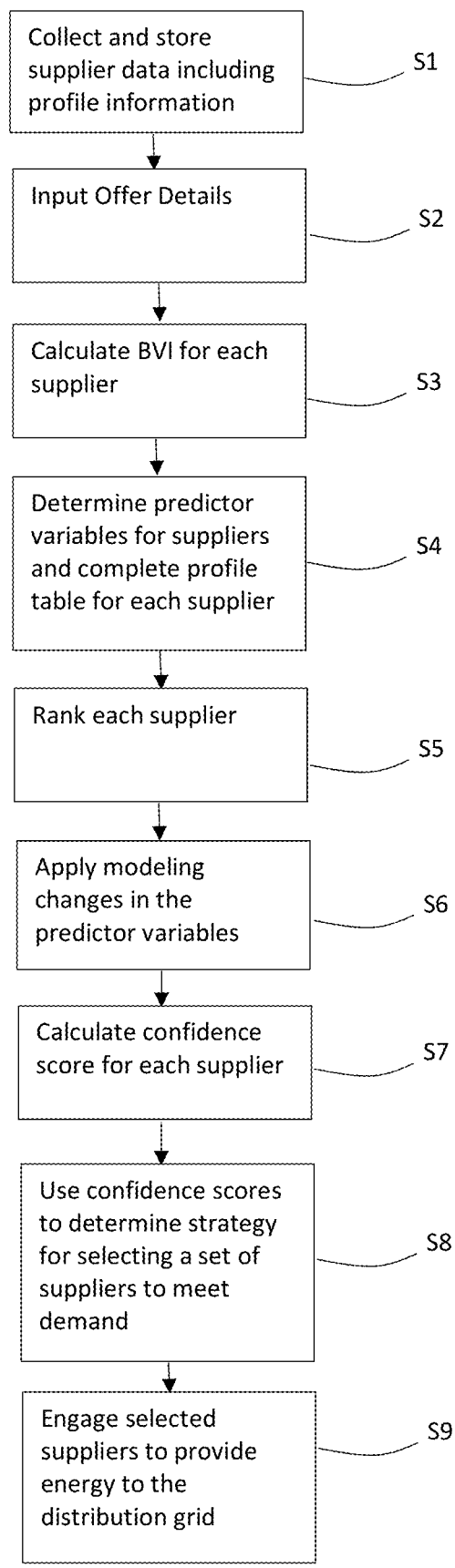
FIG. 6 depicts a flow diagram showing a method according to embodiments.
Figure 10A:
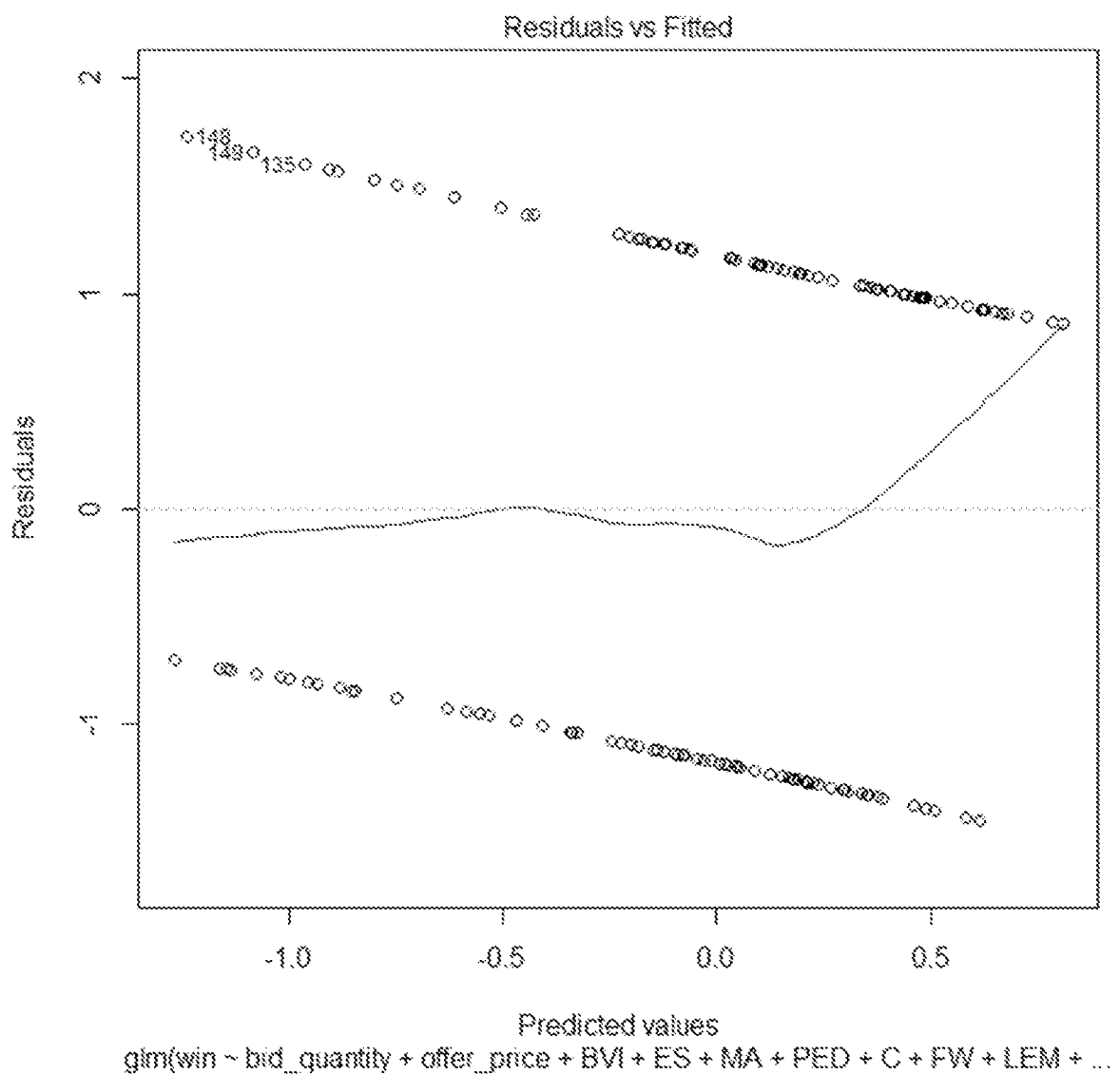
FIGS. 10A, 10B, 10C and 10D depict illustrative plots according to embodiments.
Figure 10B:
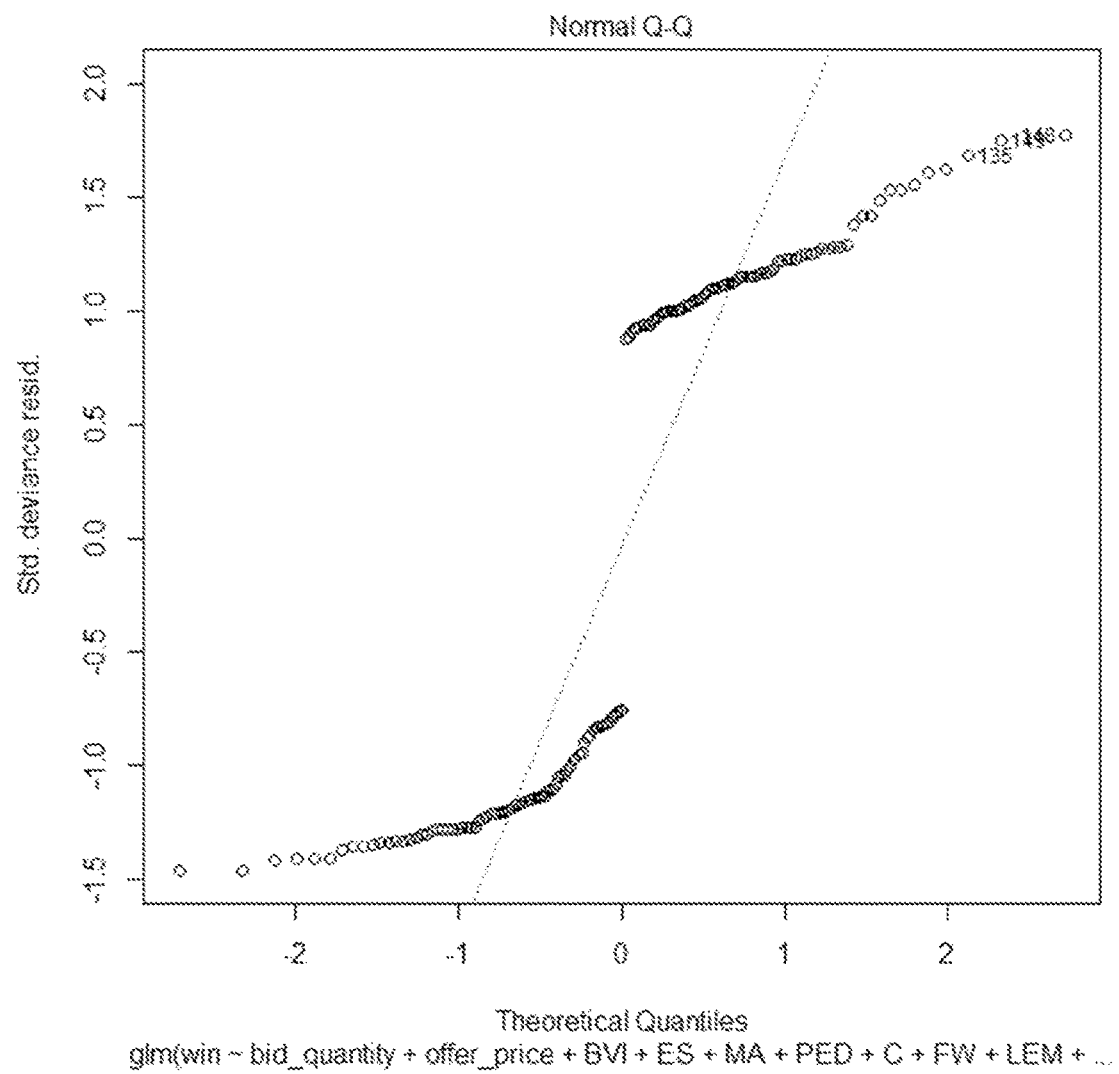
Figure 10C:
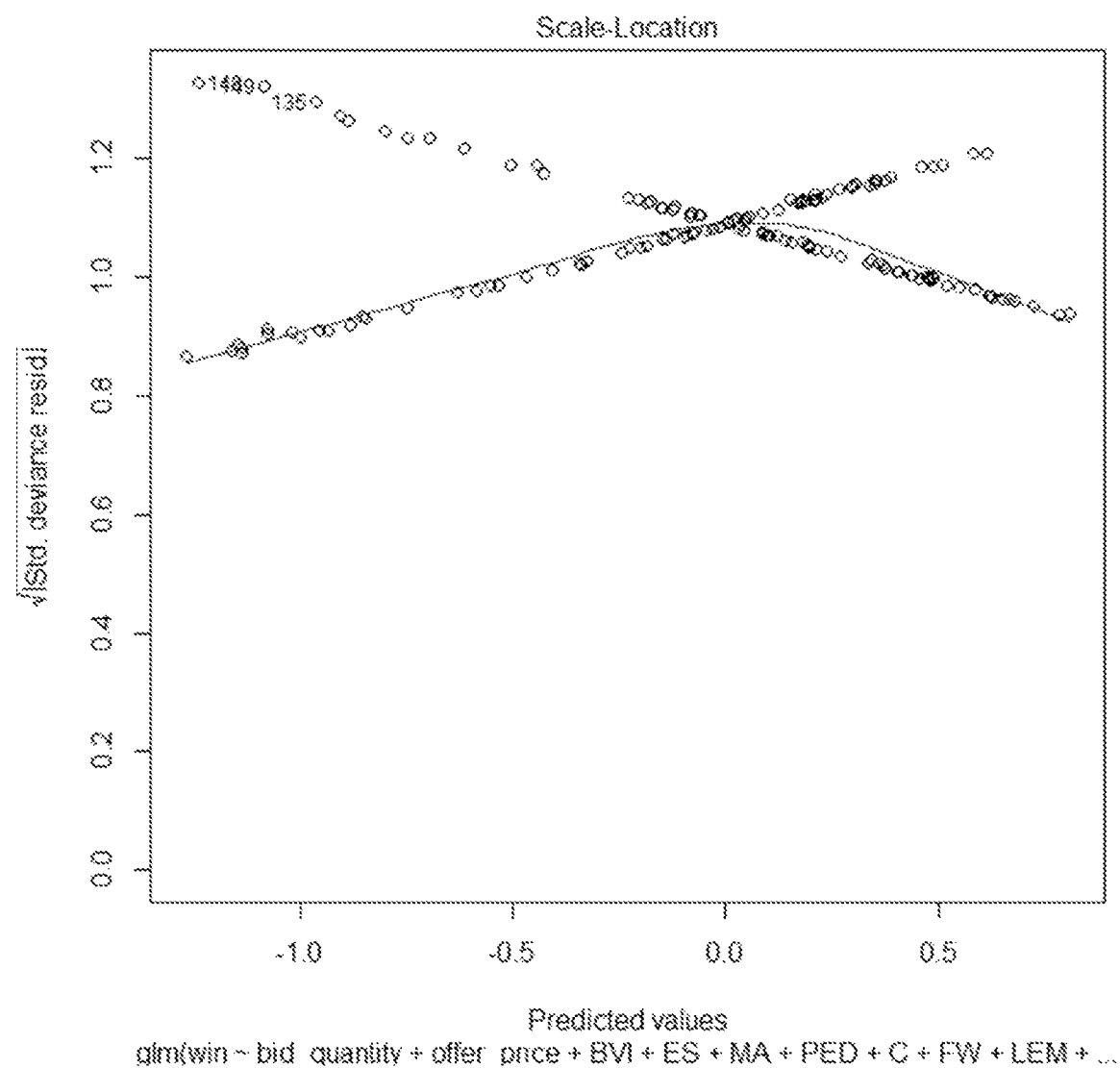
Figure 10D:
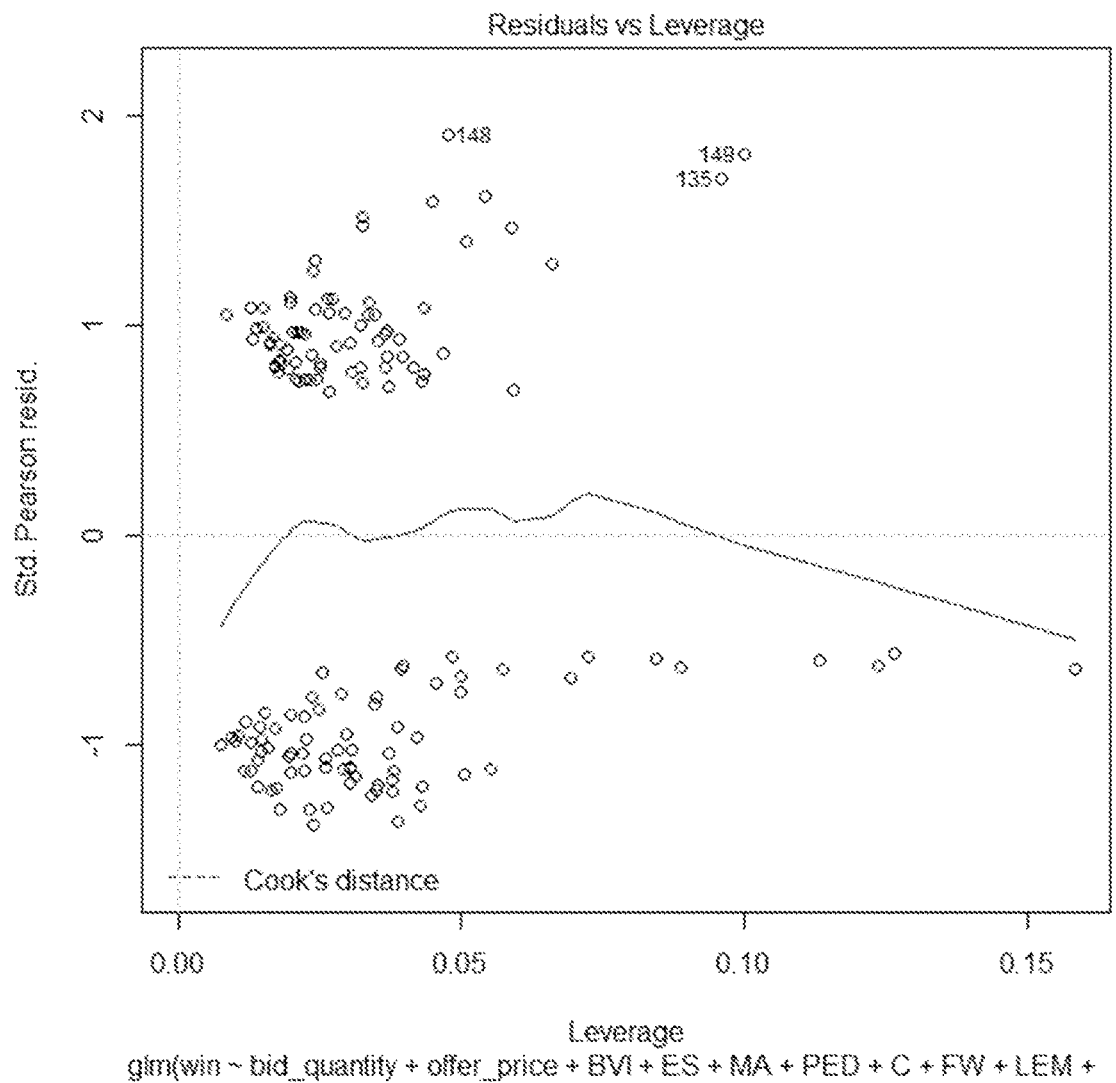

FIG. 6 depicts a flow diagram showing a method of controlling a distribution grid, with reference to FIG. 2. At S1, supplier data 36 is collected and stored each time a supplier makes a bid for an outstanding offer to supply energy. Profile information is also determined, which generally includes how a supplier will react to changes in block size and price. For example, this will help determine what will happen when a required block of energy is increased from 5 MW to 10 MW, i.e., how will the supplier respond with a change in price. The profile may indicate that the supplier likes to bid $4 for a 5 MW block and $3.75 for a 10 MW block and never bids for blocks below 5 MW and over 10 MW blocks. At S2, offer details are inputted into the system, e.g., a spot contract for 10 MW is needed for a particular time. At S3, a BVI is calculated for each user. At S4, a complete set of predictor variables are determined and a profile table is built for each supplier. Next, at S5, each supplier is ranked based on the probability of supplying a winning bid for the offer 30. At S6, modeling changes may be applied in the predictor variables to alter the probability. This may for example be done through a user interface 40 in which the user is able to manually weight predictor variables according to a given scenario. At S7, the confidence score is calculated.

At S8, the confidence score are used to determine a strategy for selecting suppliers to meet the particular demand needs. For example, if 10 MW shortage is projected, the distribution strategy and grid controller 42 may determine that three suppliers should be engaged to meet the need in which supplier 1 provides a 2 MW block, supplier 2 provides a 3 MW block and supplier 3 provides a 5 MW block. At S9, the selected suppliers are engaged to provide the energy by the distribution strategy and grid controller 42.

Consider the following example of a supplier with a total capacity of 15 MW in which the supplier has participated regularly in the bidding process. They have implemented suitable technology that minimizes the energy losses making Efficiency Scoring at 86. They have been awarded energy blocks 70% of times in any subsequent 15 tenders because of their high uptime of 95%. Historically, they have had a very successful run at their production frontier with only a few instances where they have bought energy in forward contracts up to the level of 20% of their installed capacity. They have bid consistently from $3.6 to $4.3 over their tenure of seven year presenting a bid-offer spread of 70% with 18% liquidity in the marketplace. They have an agreement of presenting collaterals for price fluctuations.

FIG. 4 (middle column) shows the calculation of p(P) by using the win loss history of 150 bids (not shown) of the supplier and reverse fitting a probability curve by solving for a and b using maximum likelihood estimates, e.g., using the program language R and a general linear model (glm).

$$\rho(P) = \frac{e^{a+b \cdot P}}{1+e^{a+b \cdot P}} = \frac{e^{1.3689+0.3516 \cdot P}}{1+e^{1.3689+0.3516 \cdot P}}$$

Clearly, supplier's probability increasing as we increase the strike price, an overall plot of possible range confirms the findings in FIG. 7. Referring again to FIG. 4, the BVI for each value P is determined and shown in the right column of the table. Thus, for a strike price of $4, the BVI is calculated as:

$$BVI = n \cdot \rho(P) \cdot (1-\rho(P)) = 150 * 0.94 * (1-0.94) = 22.09$$

FIG. 8 then shows a populated profile table in which a ranking score is provided for each entry $X_i$. From eq. 6, $$p(SC_i) = \log\left[\frac{p_i}{1-p_i}\right] = \alpha + \beta_1 \cdot 22 + \beta_2 \cdot 86 + \beta_3 \cdot 0.7 + \beta_4 \cdot 0.95 +$$
$$\beta_5 \cdot 15 + \beta_6 \cdot 3 + \beta_7 \cdot 0.18 + \beta_8 \cdot 0.7 + \beta_9 \cdot 1.16 + \beta_{10} \cdot 1 + \beta_{11} \cdot 0.$$

Having computed the values of $X_1$ to $X_{11}$, the next step is to derive the coefficients $\alpha, \beta_1 \ldots \beta_{11}$ of the predictor variables $X_1 \ldots X_k$ by employing a maximum likelihood method. FIG. 9 depicts an illustrative output of such calculation. Notice that during the retrofitting, which is an iterative process in the maximum likelihood estimates model, in this case, the variables BVI, ES, PED, C, FW, LEM, BOS, CLR, VI have not shown any significant influence on the overall probability so have been excluded from the fitting mechanism. This is not always true and may change from case to case, and time to time, but the model has the flexibility of finding these nuances and adopting to the these dimensions. In this case, the model has successfully fit all the influencing variables as shown from goodness of fit curves plotted for the fitment shown in FIGS. 10A, 10B, 10C, 10D. The probability curve is ready for fitment as:

$$p(SC_i) = \log\left[\frac{p_i}{1-p_i}\right] = -1.25650 + 2.5875 * MA - 0.81484 * CR$$

Solving the above, with offer price as $4 for a block size of 6 MWatts (with market availability as 50% and churn ratio at 1.16%, the result is $$\rho(SC_i) = 0.48$$

Figures 11, 12:
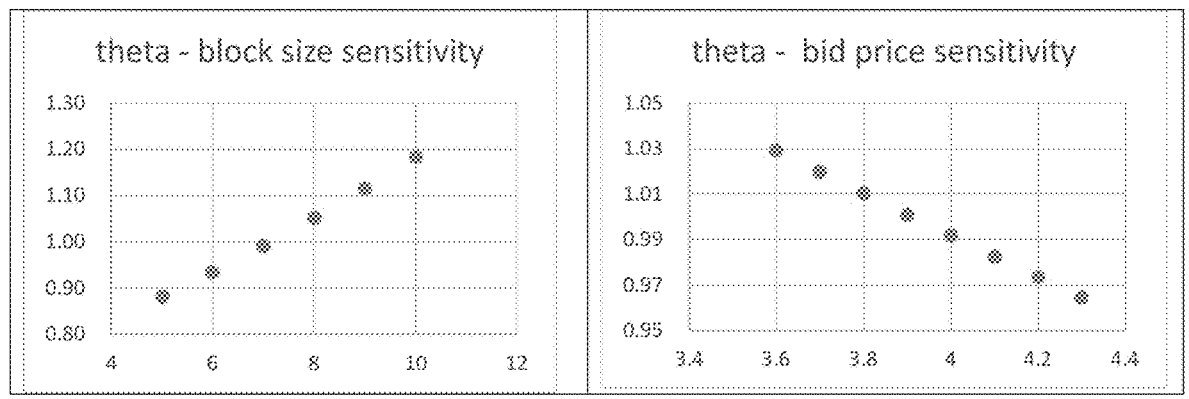
FIG. 11 depicts an illustrative table of theta according to embodiments.
FIG. 12 depicts illustrative plots according to embodiments.

And from Eq. 8, we get, $$\theta = \frac{p(SC_i)}{1-p(SC_i)} = \frac{0.48}{1-0.48} = 0.94$$

θ can be sensitized to variations of input variables to understand the supplier behavior, such as shown in the table of FIG. 11. Further as shown in FIG. 12, the odds improve with increases in block size and decrease with the decreases in the strike price, thus, the supplier is best approached for large blocks (ideal being around seven MWatts) with the offer price being close to $4.

From equation 10, S is calculated as:

$$S = \frac{C_l + 0.5 f_i}{N} \times 100\% \Big| \{\theta_i \mid i \in (1 \ldots N)\}$$

And from the supplier data set: N=500; Count of supplier's lesser than the current supplier=434; frequency of suppliers with the same θ as 13, the result is:

$$S_{52} = \frac{434 + 0.5 * 13}{500} \times 100\% \Big| \theta_{52} = 0.881$$

Indicating an 88% confidence in the supplier with current transaction.

It is understood that SCS system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the SCS system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer program product stored on a computer readable storage medium, which when executed by a computing system, evaluates energy suppliers from a set of energy suppliers to meet demand for a distribution grid, the program product comprising:
   program code that determines a bid volatility index (BVI) for each supplier for an offer;
   program code that profiles each supplier with a set of predictor variables; program code that determines a winning bid probability of each supplier based on the predictor variables;
   program code that refines the winning bid probability based on changes to at least one predictor variable; and
   program code that determines a confidence score for each supplier, wherein the confidence score indicates a confidence level that the supplier can meet the offer, wherein the confidence score is determined with equation:

$$S = \frac{C_l + 0.5 f_i}{N} \times 100\% \bigg| \{\theta_i \mid i \in (1 \ldots N)\}$$

where,
C1 is a count of all scores less than a score of interest;
fi is a frequency of the score of interest;
N is a number of the suppliers in the consideration; and
Si is the winning bid probability for the Supplier i in the consideration; and
program code that controls distribution of energy to the distribution grid based on the confidence score.

2. The program product of claim 1, wherein the BVI for a supplier is determined using a probability distribution function based on past bids of the supplier.

3. The program product of claim 1, wherein the predictor variables include: BVI, Efficiency scoring, Availability in the market, Precise Prediction of Energy Demand, Capacity, Purchase from forward markets, Liquidity in the Energy Market, Bid-offer spread, Churn ratio, Collateral Requirement for Price Fluctuation, Inter Connectors Availability, and Vertical Integration.

4. The program product of claim 1, wherein each of the set of predictor variables are ranked for each supplier.

5. The program product of claim 1, wherein the winning bid probability is determined using a logit analysis.

6. The program product of claim 1, wherein the offer comprises a bid price and block size.

\* \* \* \* \*